United States Patent Office 3,567,660
Patented Mar. 2, 1971

3,567,660
METHOD OF CONVERSION OF OIL-SPILLS INTO IMPROVED, RUBBERIZED CARBON-BLACK AND FIBER FORTIFIED ASPHALTIC MATERIALS
Joseph Winkler, 120 Wilson Drive, Hazleton, Pa. 18201
No Drawing. Filed Feb. 2, 1970, Ser. No. 7,997
Int. Cl. E02b *15/04*
U.S. Cl. 260—2.3
9 Claims

ABSTRACT OF THE DISCLOSURE

A new method of conversion of oil spills into improved rubberized, fiber fortified asphaltic materials by coagulating oil spills with previously ground, spent automotive rubber tires which have preferably been previously premixed with powdery polystyrene or asphalt, said asphalt derived from naturally occurring asphaltite from petroleum or coal tars; harvesting by mechanical means the resulting non-liquid conglomerate reacting and concentrating this mixture by distillation to an asphaltic consistency.

BACKGROUND OF INVENTION

Asphaltic materials are either mined in their natural state as asphaltites, an example being gilsonite, or are residual products from crude oil, or cracking oil or coal-tar distillations, said asphalts being modified in some instances by hot air blowing to products exhibiting specified physical and chemical properties. All these asphalts are complicated mixtures of high molecular cyclic hydrocarbons and resins, some of them containing oxygen and/or sulfur atoms in their molecules. The most industrially useful asphalts are those which have a rather high melting point, but those usually exhibit brittleness at low temperatures, rendering them unreliable for such large industrial uses as road surfacing in areas suffering from severe winter conditions.

Oil-spills are an almost normal occurrence in harbors, waterways, navigation channels, and other places where loading, unloading, storage, and heavy traffic in mineral oils in general takes place. Other incidental sources of oil-spills are catastrophic occurrences like oil tanker disasters, oil pipe or storage tank breaks, and underwater oil drilling and exploration mishaps. These oil-spills are, as it is known, very difficult to remove, especially when already contaminating the adjoining shores. Of all methods of spilled oil removal, the use of sorbents is the most recommended. In actual use are such sorbents as straw and ground corn cobs, and some mineral absorbent like perlite, clays, Cab-o-Sil, et cetera.

However, none of the sorbents tested so far are sufficiently oil reactive at acceptable costs; moreover, sorbents require a costly disposal after being soaked with oil because of transportation to specially selected places for burial or cremation. Burning creates a secondary environmental pollution problem, pollution of the air we breathe.

No wonder that presently a continuous search for a better and less expensive oil-spill sorbent is underway, conducted by many agencies and research organizations.

The United States' mechanical society is disposing hundreds of millions of spent automotive tires every year. Some of the tires return back to a rubber tire factory where the rubber is reclaimed as an additive for the manufacture of new tires. A small number of worn-out automobile tires are used for making some low cost rubber articles, such as doormats, for example.

The great majority of spent automobile rubber tires are now being dumped with junked autos along roads and highways and in all possible places all over the countryside, where they pollute our landscape. This happens because there is no economical incentive for anybody to collect these spent automobile tires as no large use has been developed for them thus far.

THE INVENTION

It has been found, and this is the main feature of this invention, that low-cost, reinforced asphaltic materials, having wide industrial uses, can be prepared from a novel reaction product of spent automobile rubber tires with mineral/oil spills whereby the process consists of the following preparation steps:

Spent automobile tires, otherwise considered useless or in excess for present applications, are shredded to a coarse grit having the desired particle size between one and ten mesh. According to numerous experiments, this specific particle size range, surprisingly, provides a sorbent with the highest ratio of the spilled oil.

Tests have indicated that particles larger than one mesh soon show a tendency to sink in water, while particles smaller than ten mesh dissolve too quickly in the oil; thus, in both cases an unproportionately larger ratio of it is required to recover the spilled oil.

Having thus established the useful and preferred range of particle sizes of the shredded, spent automobile rubber tire material under this invention, its further action upon the spilled oil was found to proceed as follows:

When the shredded material is strewn or hosed upon the spilled oil contaminated water surface, its particles act like a magnet, attracting the oil by preferential wetting ability with the oil against the underlying water. This is because particulate spent automobile tire composed of essentially rubber polymers, carbon black and short fibers, is highly oleophilic and simultaneously hydrophobic. Moreover, in a short time these particles swell from the imbibed oil and quite quickly coagulate to large non-liquid conglomerates, while attracting and coalescing more oil around each particle. These resulting conglomerates contain about 10-15% of the initial rubber tire material, the balance being the absorbed spilled oil.

In cases where the spilled mineral oil or hydrocarbon oil does not contain the desired asphaltic materials, another feature of this invention is to first combine the shredded, spent automotive rubber tire material with powdery polystyrene or high-melting asphalt; the latter being gilsonite or any other natural or artificial asphaltic material prepared, for example, from coal-tar residues or from oil cracking operations. The useful weight ratio of the shredded, spent automobile tire material to the polystyrene or asphalt was found to be from 10:1 to 1:10, but is preferably at a level of 1:1 by weight.

This blending of polystyrene or asphalt with shredded, spent automobile tire material is achieved by tumbling together these materials, thus providing an intimately formed particulate composition.

The presence of polystyrene or asphalt on top of the shredded material was found to greatly facilitate and accelerate coagulation of the spilled oil around the shredded spent automobile tires.

The herein disclosed new method and composition cannot be equalized or compared with well-known preparations in which various asphalts are modified with natural or synthetic rubbers wherein virgin rubber crumbs are slowly introduced into a hot asphalt and carefully compounded to a final product of certain expected physical properties or a composition responding to prior-established specifications.

In this invention no actual compounding of ingredients takes place. Here, by the very nature of the occurring oil-spills which as a liquid covers a water surface, the particulate, spent automobile tires are brought into contact with the oil spills by topical scattering or hosing. The necesary amount of the particulate spent rubber tires is variable, depending upon the type and kind of the oil spill; heavier oils require less of the particulate automobile tire material than light oils do.

After the topical hosing or scattering operation and following the swelling of the rubber tire crumbs by the oil, the resulting non-liquid conglomerates are easily skimmed-off and harvested into vessels on board ships standing by for that purpose.

There, the jelly-like material is liquefied and co-reacted into an asphalt-like material by heating, while volatile ingredients from the oil itself and from heat-induced partial decomposition of the spent particulate tire rubber are driven off and condensed into useful hydrocarbon liquids. Since the shredded, spent automobile tires contain not only rubber but carbon black, various fibers from the tire carcass, and small amounts of additives such as zinc oxide, adhesives, et cetera, these materials are due to show up in the resulting asphalt-like product of this invention.

Thus, the final product of this invention is completely different chemically and physically from any known, purposely made asphalt-rubber-polymer blends.

This invention furthermore merits great importance in view of its great usefulness for environmental pollution control. It fulfills a most urgent national and worldwide demand to check and improve our steadily deteriorating environmental conditions due to land, water, and air pollution.

Spent rubber tires, in the staggering amount of about 100 million units thrown away annually, usually are disposed around and on the fringes of our roads, highways, in parking lots, gas stations and other incidental places.

Oil spills are occurring almost daily along our shores, in waterways, bays, lakes, seas, around oil tank farms, and at most places where oils are available and handled.

The burning of spent automobile tires and spilled oil, a usual practice to eliminate each of these pollutants separately, leads to air pollution of the air with which we breathe!

The present invention therefore appears to be a highly purposeful novel approach to an overall pollution control, by first removing from our landscape uncountable unsightly spent automobile tires, these becoming a means for the recovery of polluting oils from water surfaces; the resulting combination being finally processed into a variety of useful large volume commercial materials.

The large scale use of spent automobile tires as an absorbent of oil spills will stimulate their collection all over the country and after locally performed processing to a particulate form, shall become applicable for the removal of oil spills wherever they pollute neighboring water surfaces. In order to easily fulfill this purpose, ground spent rubber tires should be kept in storage all over the country in compressed bales like peat moss, and be available in warehouses located near ports and places where oil spills appear likely to occur.

Restoring nature to its natural state is a cause for all mankind! We must keep our land, water, and air clean and this invention is believed to be a proper way towards this goal.

The following examples are illustrative of this invention:

EXAMPLE 1

The most frequent oil spills in major ports and harbors are of Bunker Oil No. 6 which is used as a low cost ship fuel. It has the following average composition:

(1) Spec. gravity/60/60° F.—0.969
(2) Sulphur content—2.6%
(3) Viscosity SSU at 100° F.—170
(4) Flash point CoC, ° F.—180
(5) ASTM distillation corrected to atm. in ° F:
  IPB—489
  10%—596
  50%—927
  62% started to crack—971
(6) Aromatics—65%
(7) Paraffins plus naphthenes—20%
(8) Asphaltenes—15%

This spilled bunker oil is hosed as evenly as possible with a coarsely shredded to a five mesh particle size spent automobile tire material in the ratio of about 1:15 by weight to the estimated spilled bunker oil. The liquid oil quickly coalesces around these particles into large, coherent agglomerates.

These coherent, large blobs are now removed by mechanical means from the water surface and loaded into vessels where the entrained moisture settles and is conveniently removed. The resulting water-free jelly-like fluid is liquified by moderate heating and pumped into storage from where it is transferred into distillation units. There, the non-volatile ingredients are heat reacted while the volatile components are distilled-off. The non-volatile reaction product composed of asphalt, rubber polymer, carbon-black, and some short fibers, constituting about 35% of the initial charge, are finally air blown at increasing temperatures from 450° F. to 550° F. until a proper grade of the asphaltic composition is attained.

The new asphaltic composition containing rubber polymers, carbon black, and fibers provides an improved, low-cost material highly valuable for road construction, floor surfacing tiles, roofings, and other building purposes.

EXAMPLE 2

A Texas-grade crude oil, containing about 35% gasoline, 20% kerosene, 15% gasoil, and 30% residue consisting of about half in half of luboils and asphaltic materials, is spilled by mistake from a tanker and has contaminated a navigation channel.

In order to remove this polluting oil from the water surface, a helicopter spreads upon the oil contaminated surface spent automobile tire material ground to five mesh size and compounded with 20% powdery polystyrene. The used amount of the rubber tire flocks is calculated on a 1:8 oil/weight ratio. This amply suffices to absorb the supernatant oil and to conglomerate it to coherent, non-liquid coagulants. A specially equipped ship with booms and mechanical scoops removes the solidified material and transfers it to heated vessels on board. The crude oil, rubber-carbon-black-fiber composition is fully dewatered and liquified to a syrupy fluid.

This compound is transported to a refinery, where it is heat co-reacted and concentrated to a residue, while essentially distilling-off the volatile fractions such as gasoline and kerosene, gasoil, and lubricating oils. The remaining residual reaction product, consisting of about 25% of asphalt reinforced with rubber, carbon-black, and short fibers is, by hot air blowing, at a temperature of 400° F., made into a temperature resistant road asphalt or used for the production of improved, flexible and strong asphalt-type roof shingles and floor tiles.

This novel rubber carbon-black and fibers composed asphalt is superior to any now available asphalt derived from mineral oil distillation bottoms, even when said bottoms were blown with hot air.

EXAMPLE 3

An asphalt-free kerosene spill is to be cleaned up from a harbor where such an occurrence took place due to a mishap. A previously prepared particulate mixture, consisting of 50 parts of spent automobile tire material and 50 parts of gilsonite asphalt, this mixture having an average particle size of ten mesh, is used in a ratio of 1:5 (kerosene) to absorb and remove this fuel from the water surface in ways described in the specification and Examples 1 and 2. The resulting conglomerate, composed of kerosene and gilsonite plus the rubber, carbon-black, and fibers derived from the tire carcass, this composition having the appearance of solidified globules, is further reacted and concentrated in a distillation unit where the kerosene is distilled off. The asphaltic residue now containing rubber, carbon-black, and short fibers, is commercially used for purposes indicated in the specification.

While specific examples of the invention have been set forth hereinabove, it is not intended to limit the invention solely thereto, but to include all of the variations and modifications thereof which are within the scope of the appended claims.

What is claimed is:

1. A process for the preparation of rubber, carbon blacks, and fibrous material reinforced asphaltic compositions, while simultaneously removing spilled oils from water surfaces by using coarsely shredded, spent automobile rubber tires which comprises contacting coarsely shredded spent automobile tire having a particle size from one to ten mesh, with the spilled oils to sorb the oil on said particles of spent automobile rubber tires, harvesting the resulting conglomerates and reacting and concentrating the asphaltic composition by distilling off the volatile components at elevated temperature, at least one of said spilled oils and said particles of spent automobile rubber tires including an asphaltic component.

2. A process as in claim 1 wherein the coarsely shredded, spent automobile rubber tire is used in ratios from 1:5 to 1:20 of the spilled oil.

3. A process as in claim 1 wherein the coarsely shredded automobile tire is premixed with powdery polystyrene in ratios from 10:1 to 1:10.

4. A process as in claim 1 wherein the coarsely shredded spent automobile tire is premixed with a high melting asphalt in ratios from 1:10 to 10:1.

5. A process as in claim 1 wherein the reacted and distillation concentrated composite asphaltic material is further subjected to hot air blowing at temperatures from about 300° F. to 600° F.

6. The process of claim 1 wherein the asphaltic component is present in said spilled oils.

7. The process of claim 1 wherein the asphaltic component is present in said particles of spent automobile rubber tires and is powdery polystyrene.

8. The process of claim 1 wherein the asphaltic component is present in said particles of spent automobile rubber tires and is gilsonite.

9. The process of claim 1 wherein the asphaltic component is present in said particles of spent automobile rubber tires and is a coal tar residue.

References Cited

UNITED STATES PATENTS

| | | | |
|---|---|---|---|
| 2,632,012 | 3/1953 | Boldingh | 210—40X |
| 3,147,216 | 9/1964 | Oemler | 210—40 |
| 3,494,862 | 2/1970 | Horowitz | 210—40 |

SAMIH N. ZAHARNA, Primary Examiner

U.S. Cl. X.R.

106—282; 210—40